(12) United States Patent
Block

(10) Patent No.: US 11,896,158 B2
(45) Date of Patent: Feb. 13, 2024

(54) AUTOMATED ASEPTIC FRYER

(71) Applicant: Gerald J. Block, Rancho Santa Fe, CA (US)

(72) Inventor: Gerald J. Block, Rancho Santa Fe, CA (US)

(*) Notice: Subject to any disclaimer, the term of this patent is extended or adjusted under 35 U.S.C. 154(b) by 0 days.

(21) Appl. No.: 18/074,130

(22) Filed: Dec. 2, 2022

(65) Prior Publication Data

US 2023/0172394 A1 Jun. 8, 2023

Related U.S. Application Data

(60) Provisional application No. 63/285,139, filed on Dec. 2, 2021.

(51) Int. Cl.
| | |
|---|---|
| *A47J 37/06* | (2006.01) |
| *A47J 36/32* | (2006.01) |
| *A21C 1/08* | (2006.01) |
| *A47J 44/00* | (2006.01) |

(52) U.S. Cl.
CPC ............. *A47J 37/0641* (2013.01); *A21C 1/08* (2013.01); *A47J 36/321* (2018.08); *A47J 44/00* (2013.01)

(58) Field of Classification Search
CPC .. A47J 2027/006; A47J 27/18; A47J 37/1214; B65D 75/5811; B65D 75/5883; A23L 19/05; A23L 19/14; A23L 19/18; A23L 27/60; A23L 27/63; A23P 20/20; A23P 20/25; A21D 13/32
USPC .......... 426/438, 233, 523, 519, 283; 99/325, 99/326, 337, 338, 342, 352, 450.4, 450.5, 99/348, 357, 443 R, 486; 219/438, 429
See application file for complete search history.

(56) References Cited

U.S. PATENT DOCUMENTS

| | | | | |
|---|---|---|---|---|
| 4,550,653 | A * | 11/1985 | Hedenberg | A21B 1/22 99/348 |
| 4,550,654 | A * | 11/1985 | Hedenberg | A21B 7/005 99/348 |
| 4,590,850 | A * | 5/1986 | Hedenberg | A47J 43/04 99/348 |
| 5,146,840 | A * | 9/1992 | Hedenberg | B65D 81/3266 99/341 |
| 5,167,979 | A * | 12/1992 | Benson | A47J 37/1214 426/492 |
| 8,034,390 | B2 | 10/2011 | Sus | |
| 8,276,505 | B2 | 10/2012 | Buehler | |
| 9,320,388 | B2 | 4/2016 | Storek | |
| 9,462,819 | B2 | 10/2016 | Neff | |

(Continued)

*Primary Examiner* — Tu B Hoang
*Assistant Examiner* — Vy T Nguyen
(74) *Attorney, Agent, or Firm* — Stuart H. Mayer; Kaplan Breyer Schwarz LLP

(57) ABSTRACT

An on-demand automated aseptic fryer may be used to prepare multiple types of fried foods without requiring vats of hot oil. The fried foods that may be prepared include, for example, donuts or potatoes, or any other fried foods that can be prepared from a dry mixture that produces a dough when mixed with water. Alternatively, the dry mixture may include a dried, powdered or reconstituted fruits or vegetables that are subsequently mixed with water. The entire process is automated once the process is initiated by a user and thus does not require an attendant during the frying process, which in some implementations can be completed in less than about 1.5 minutes once initiated.

13 Claims, 8 Drawing Sheets

(56) References Cited

U.S. PATENT DOCUMENTS 10,602,869 B2 3/2020 Yu et al.
2015/0216350 A1* 8/2015 Talon .................. A47J 31/3628
99/295

* cited by examiner

FRYER NOZZLE
(TOP VIEW)

AUTOMATED ASEPTIC FRYER

CROSS-REFERENCE TO RELATED APPLICATION

This application claims the benefit of U.S. Provisional Application Ser. No. 63/285,139, filed Dec. 2, 2021, the contents of which are incorporated herein by reference.

BACKGROUND

A standard method for producing fried dough-based foods such as donuts requires:
a) A staging area for dough preparation
b) A cooking area with a hot-oil deep fryer
c) A cook/attendant.

Cooking automatically or using robotics has made several inroads recently. However, food produced thereby is often deemed not of the highest quality. This is particularly the case for fried foods. Moreover, robotics does not fully eliminate each of the required items noted above Accordingly, there is a need for improvements in on-demand food preparation for e.g., point-of-use (e.g., residential) and point-of-sale use.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

In one aspect, systems and methods according to present principles provide an on-demand fry technology that has applications in multiple types of foods, especially fried foods, and may be especially applicable to foods such as donuts and potatoes. The systems and methods according to present principles may also be applied to pureed or dried, powdered, reconstituted vegetables. Other applications will also be seen by one of ordinary skill in the art, e.g., using fresh vegetable mixtures.

Advantages of the invention may include, in certain embodiments, one or more of the following. Systems and methods according to present principles provide a delicious on the go eating experience. Systems and methods according to present principles are highly scalable. Systems and methods according to present principles may be employed with a small footprint, e.g., a kiosk, a corner of a convenience store, and so on. Systems and methods according to present principles may provide a delivery system that is quick, efficient, and fun for consumers. In addition, systems and methods according to present principles may be provided in simpler and/or cost reduced form and applied to home, office, or other non-resale environments. Systems and methods according to present principles may be applied in bulk form, where a single pouch or source of food product is employed for multiple servings, or in a single serving variation, where one pouch (e.g., per ingredient or group of ingredients) equals one serving.

Other advantages will be understood from the description that follows, including the figures and claims.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

DETAILED DESCRIPTION

In one aspect, an on-demand automated aseptic fryer is presented herein that may be used to prepare multiple types of fried foods without requiring vats of hot oil. The fried foods that may be prepared include, for example, donuts or potatoes, or any other fried foods that can be prepared from a dry mixture that produces a dough when mixed with water. Alternatively, the dry mixture may include a dried, powdered or reconstituted fruits or vegetables that are subsequently mixed with water. The entire process is automated once the process is initiated by a user and thus does not require an attendant during the frying process, which in some implementations can be completed in less than about 1.5 minutes once initiated. To meet safety objectives the various operational steps can be performed in a manner that does not expose them to the ambient environment and also ensuring a clean machine environment.

As described in more detail below, the on-demand automated aseptic fryer includes a disposable sealed pouch containing the dry mixture. The fryer automatically pierces an opening in the pouch and mixes it with a liquid (e.g., water) and then extrudes and cooks the resulting mixture using a mixture of hot air and atomized hot oil. The cooked product is presented to the user and the empty pouch is ejected from the fryer for disposal.

Figure 1:
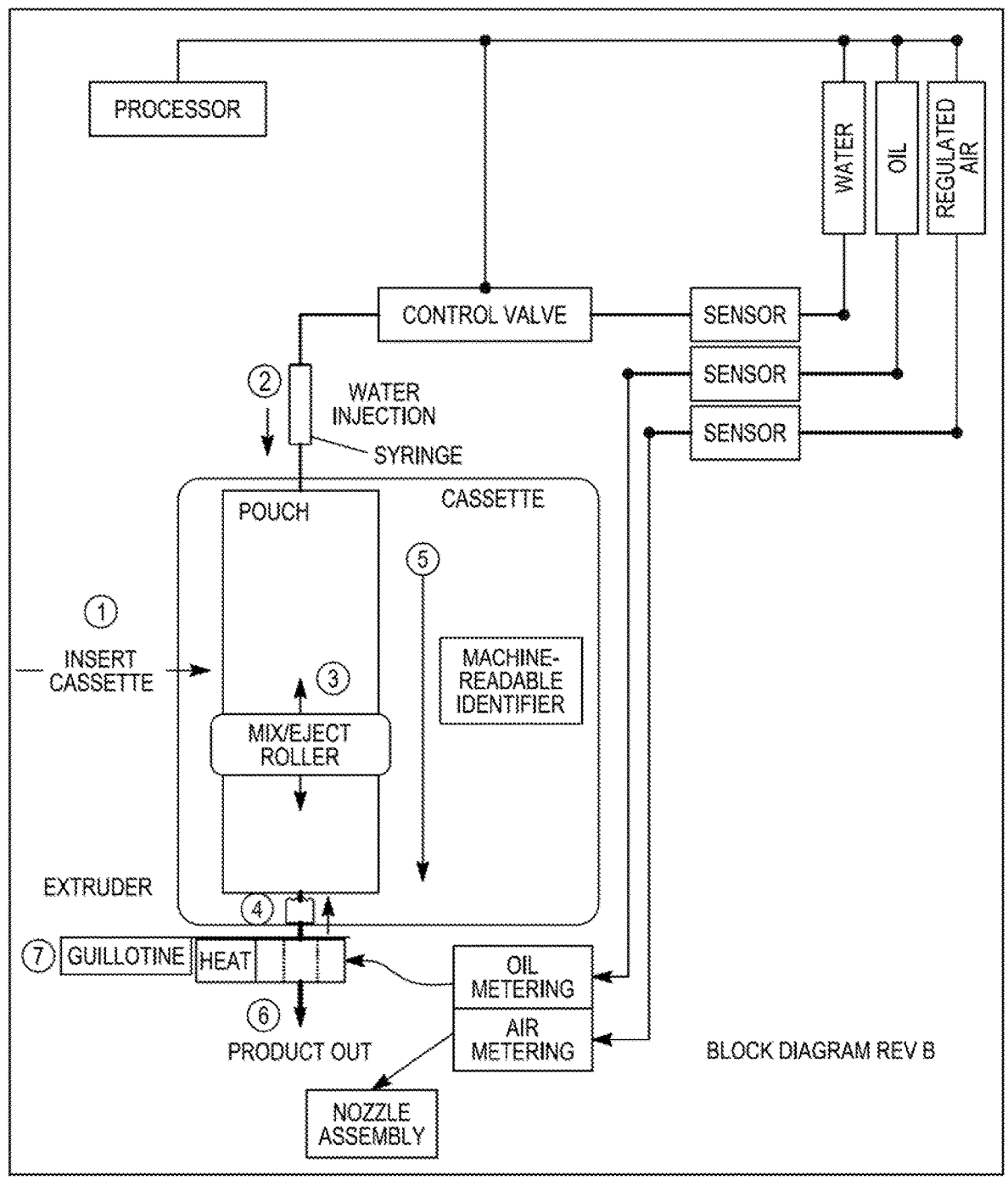
FIG. 1 shows a simplified schematic illustration of an on-demand automated aseptic fryer according to present principles.

A simplified schematic block diagram of one example of the on-demand automated aseptic fryer is shown in FIG. 1. The fryer includes an exterior housing into which the user inserts a sealed pouch containing the dry mixture. In some embodiments, described below, the sealed pouch is incorporated into a cassette that is inserted by the user into the housing. The various internal components of the fryer housing will be discussed below.

A series of supply elements that are common between different food products may be stored in the fryer housing, or the same may be provided by way of a plumbed fixture or other hookup from an exterior source. As shown, these common supply elements include water, cooking oil, and air, each of which may be regulated in pressure using an appropriate regulator and/or control valve. The water may be regulated in pressure or may be simply gravity-fed, with pressure being determined by their outlet nozzles. The water may be provided by a common water source separate from the product canister, i.e., to eliminate the need for a plumbed water source, use of a common industrial size of water bottle may be employed and may be beneficial in some embodiments. In larger systems an e.g., 5 gallon water jug may be employed.

The entire operation of the fryer is controlled by a microprocessor (e.g., a programmable logic controller), which controls the steps of the frying process. A user interface may be provided that allows the use to intiate the automated process under the control of the processor. In some case the user interface may also allow the user to select values for various parameters, such as oil temperature, frying duration, and so on. The user interface may also allow the user to select from among various food options that are to be prepared, specifying whether the end product is to be say, a donut or whipped potatoes. Selection of one of these options may load pre-programmed frying parameters (e.g., oil temperature, frying duration) into the processor, thereby avoiding the need for the user to enter each of them manually. The processor may be operated under the control of instructions provided in hardware, firmware, software or any combination thereof.

As described below, the processor controls various components such as actuators, stepper motors, control valves, pumps, misting elements, heating elements and the like, which are incorporated in the fryer and used to produce the final fried product. Those of ordinary skill in the art of industrial control will understand that these various components may be implemented in a wide variety of different ways to perform the particular process steps discussed below. Accordingly, for the sake of clarity such implementation details are omitted from the following discussion.

In more detail, for ease of maintenance and cleanliness, the dry product (also termed herein "dry mixture") may be delivered to the machine in the form of a disposable sealed pouch that is formed from a flexible film. In some embodiments each pouch may include apparatus or the like to allow the fryer to identify the product type automatically. For example, each pouch may have a ID barcode or ID chip that is read by an associated reader in the fryer, and in this way information may be transmitted to the fryer that allows the system to automatically load into memory a "recipe", which essentially provides the operating steps, as well as parameters about amounts and timings of powdered food, amount of water if any, amount of oil if any, amount of air if any, as well as their ratios, temperatures, a nozzle temperature or profile of temperatures, orders of introduction, and so on, as needed in a given recipe to provide the proper cooking environment for an associated food product. In this way the user may not need to employ the user interface described above, which in some embodiments may be eliminated altogether or which may be provided to allow the user to override some of the parameter values specified by the recipe. The ID may also serve to automatically read out other aspects of the pouch, including product type, lot number, expiration date, amount, etc. The ID may specify the process parameter values themselves or it may provide a network address from which the process parameter values can be obtained.

In some embodiments the fryer may be designed to accommodate pouchs that have a single size and which contain a fixed amount of dry product that is the same from pouch to pouch. In these embodiments the size of pouch may depend on whether the fryer is intended to home use, in which case the pouchs may be designed to accommodate a single serving of dry product. On the other hand, the pouchs may be larger if intended for use in a retail environment. For example, in a small retail system the pouchs may hold at least 1 lb of product mix. For retail use, the size of the pouch may reflect the sales volume, and thus more than one model may be employed with suitable sizing. In some cases a "Quantity Remaining" indication may be provided to assist in automatic re-order and alarms.

As mentioned above, in some embodiments the disposable pouch is provided as part of a cassette that includes not only the pouch but also a supporting frame to which the pouch is secured (using, e.g., adhesive). An example of a supporting frame is shown in FIG. 1 with the pouch attached. The frame may be fabricated from plastic or other suitable material. As further shown in FIG. 1, the frame may include an extruder barrel or tube at the bottom through which the premixed product exits after the dry product has been mixed with water to form a dough or other premixed product. The entire cassette, including the pouch and the frame, may form a disposable unit that is replaced when the pouch is empty and no longer contains the dry mixture. When a cassette is employed, the ID or other information described above may be located on the frame instead of, or in addition to, the pouch.

As illustrated in FIG. 1, the cassette is manually inserted into the housing where it is received by a mixer assembly that holds the cassette in a predetermined location and a predetermined orientation. Once the cassette is properly positioned in place and the frying process initiated, an actuable piercing element (e.g., a syringe in FIG. 1) is advanced under the control of the processer to pierce a top portion of the pouch to form a small seal, after which the piercing element may be retracted, if necessary, so that water (or other liquid) is directed into the opening from a water source. If the piercing element is a syringe, it need not be retracted and the water can be directed through it and into the opening in the pouch. The syringe or other piercing element may be mounted on a lever arm which is controlled by a small motor, which can be actuated on the command of the processor. When the syringe is withdrawn the seal re-seals.

Figure 2:
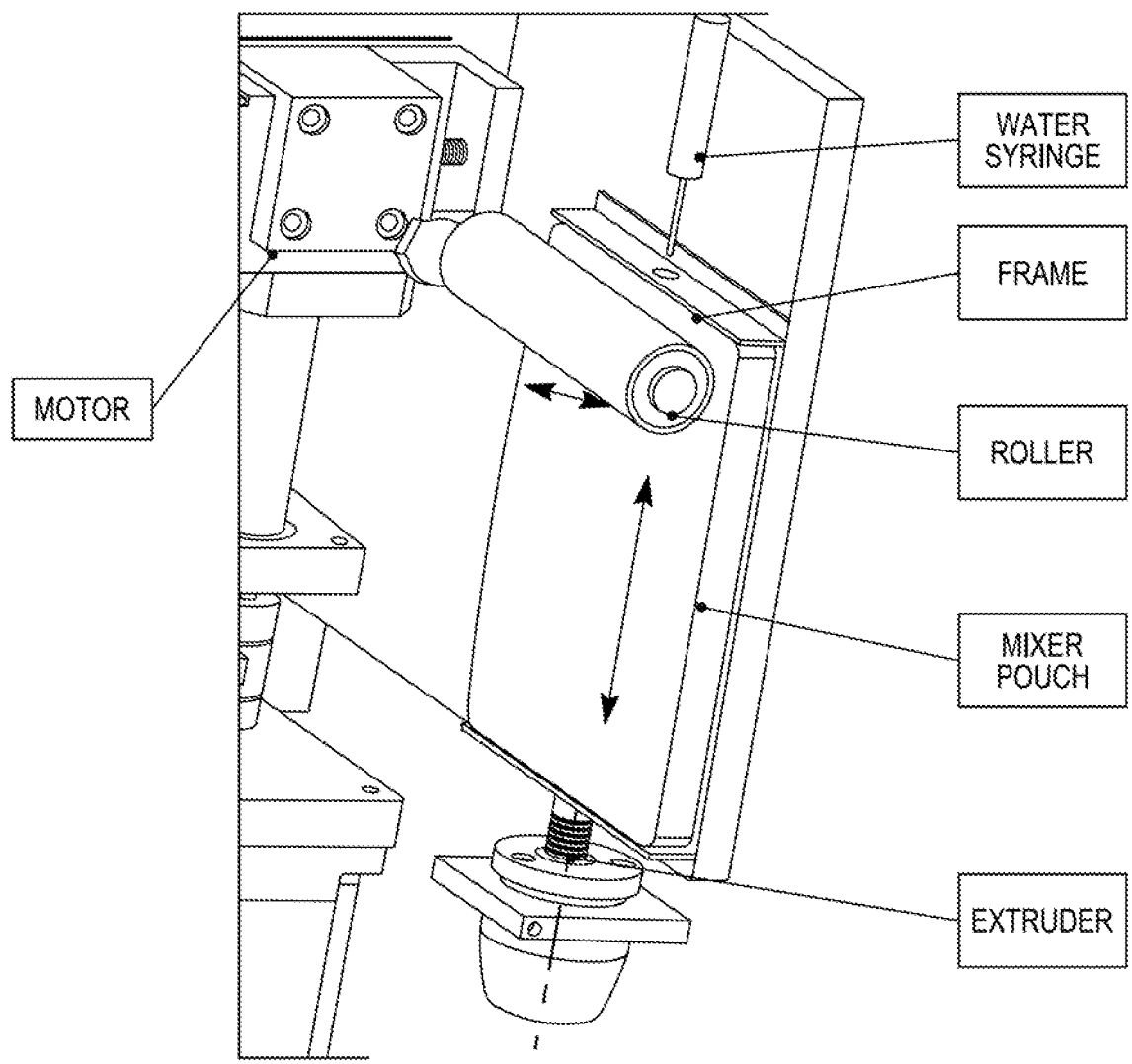
FIG. 2 shows one particular example of the mixer assembly employed by the on-demand automated aseptic fryer of FIG. 1, with the cassette properly positioned.

One particular example of the mixer assembly, with the cassette properly positioned, is shown in FIG. 2. The cassette, including the frame (with the extruder barrel) and the pouch, are clearly shown in FIG. 2. As shown in both FIGS. 1 and 2, one or more rollers forces contact with pouch and oscillates up and down to mix the internal contents into e.g., dough form. In this way mixing is performed within the sealed pouch. The mixing roller may be controllable in two directions: toward and away from the pouch, and up and down laterally across the pouch. In some embodiments movement of the roller(s) may be performed by miniature stepper motors using a commonly used linear stage. The mixing roller moves in and closes on the pouch and slides up and down the packet contents to physically mix the contents. The dry ingredients and the water remain within the pouch because it is still in the sealed state.

When mixing is complete, the roller may be moved to the top of the pouch so that it subsequently may be used to facilitate ejection of the mixed product from the pouch. Prior to ejection an opening is cut in the pouch bottom by a cutting mechanism associated with the extruder barrel. In some embodiments the extruder barrel may be actuatable so that it is moved upward and penetrates through the pouch to thereby create the opening. Once the cut has been made in the pouch, the mixing roller(s) exerts a force on the top of the pouch. The roller continues to exert the force as the roller moves laterally in a downward direction along the pouch, causing the mixed product to be ejected from the pouch in a manner similar to that used to eject toothpaste from a tube. In this way the roller(s) effectively serves as an ejection pump, ejecting the mixed product through the extrusion tube. In some cases the roller speed (i.e. displacement) may be adjusted under the control of the processor to thereby control the flow rate of the mixed product out of the pouch. In some cases the flow rate may be determined by parameters that are included in the recipe that is currently employed to produce the finished product.

In some embodiments ejection of the premixed product from the pouch may employ additional means that may supplement or replace the use of the roller(s). For instance, techniques employing low frequency vibration, ultrasonic vibration, or other methods could be used.

As seen in FIGS. 1 and 2, the output of the mixer pouch flows through the extruder barrel and is directed into a fryer nozzle assembly that performs the cooking process as the premixed product flows through it. As explained in more detail below, the premixed product is extruded through the nozzle assembly and a mist of superheated oil mixed with air surrounds the premixed product as it exits from the nozzle. The fryer nozzle assembly may be concentric, meaning that the premixed product travels down the center of the nozzle and the hot oil/hot air environment is provided in a circular pressurized mist which surrounds the mixture as it exits. The product cooks and solidifies in a single action The fryer nozzle assembly produces a hot oil mist by the use of shaped and aimed output jet orifices formed in the nozzle, and the hot oil may be atomized by the hot air as it is metered by an air metering valve. The mix between the oil and hot air may be controlled with proportional valves and pressure control, and provides for a different cooking mix for different types of foods or by customer preference, i.e., such as 'low oil'.

In general, nozzles can be sized/shaped specifically for each product. The food may be mostly cooked when it is deposited, and the same may continue to cook via residual heat for a number of seconds thereafter. The nozzle may be heated to the correct cooking temperature by a heating element controlled by the processor just prior to the product extrusion. The nozzle may be immediately cooled after the process is completed by continuing to provide pressurized air for a number of seconds, now used for cooling. The nozzle jet orifices may be positioned such that the jets provide a swirling air/oil mix of atomized oil which surrounds the product as it is ejected from the nozzle body.

As indicated in FIG. 1, the air and oil supplied to the nozzle assembly may be pressurized using pumps and metered through proportional control valves along with precision orifices, which are located in the fryer nozzle assembly.

Figure 3:
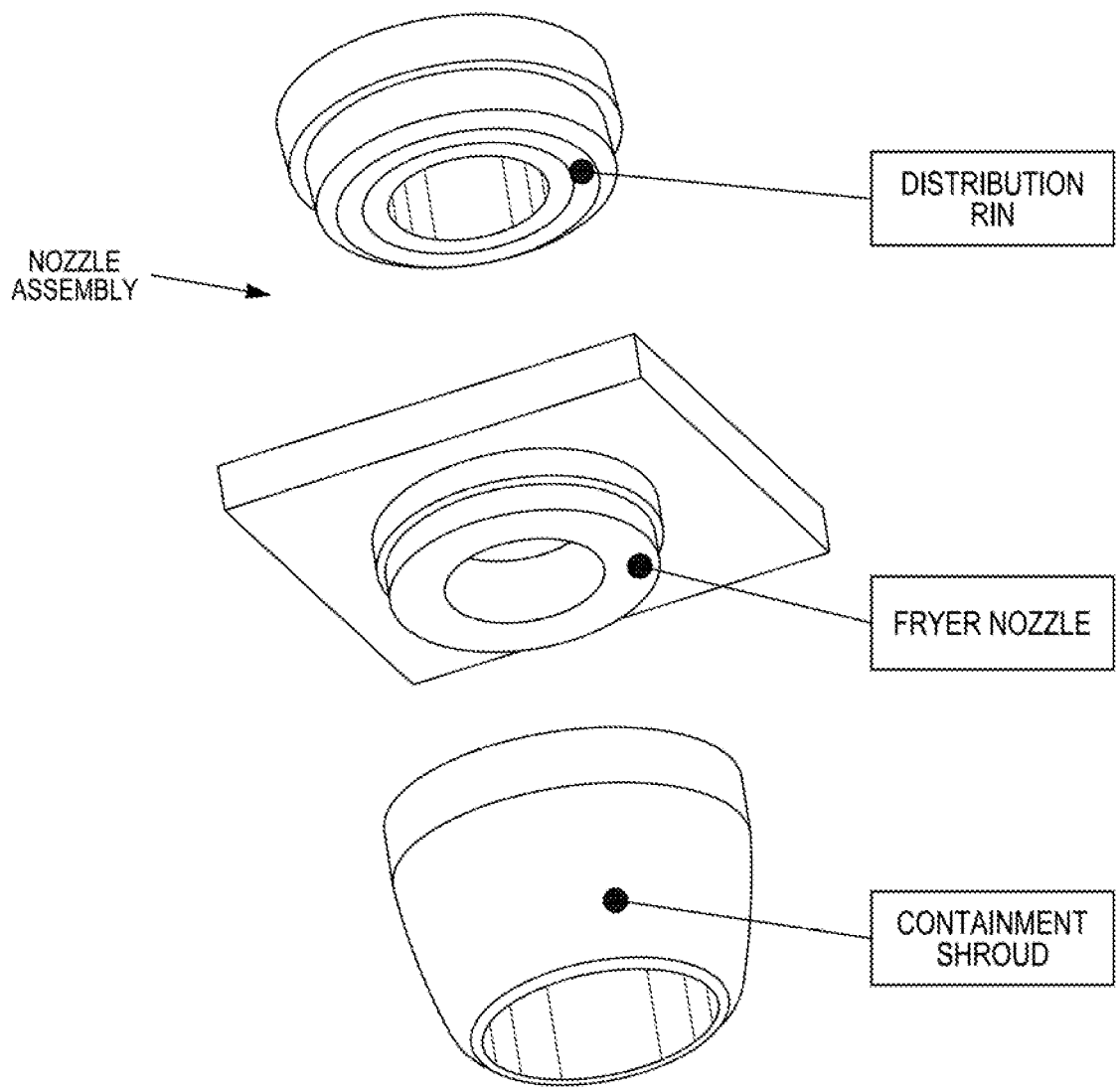
FIG. 3 is an exploded view of one example of the nozzle assembly.

One particular embodiment of a nozzle assembly that may be employed is shown in FIGS. 3 to 8. FIG. 3 is an exploded view of the nozzle assembly. The premixed product flows through the central opening in the three components. The upper component is a ring assembly, which separately introduces the oil and air to inner and outer annular chambers, respectively (sealing O rings not shown). The center component is the fryer nozzle, which has tiny (e.g., 0.01 inch in diameter or less) atomizing openings on its lower surface. The lower component is a containment shroud, which keeps the mist from spreading outside the nozzle area. The three components may be screwed together into a single nozzle assembly.

Figure 4:
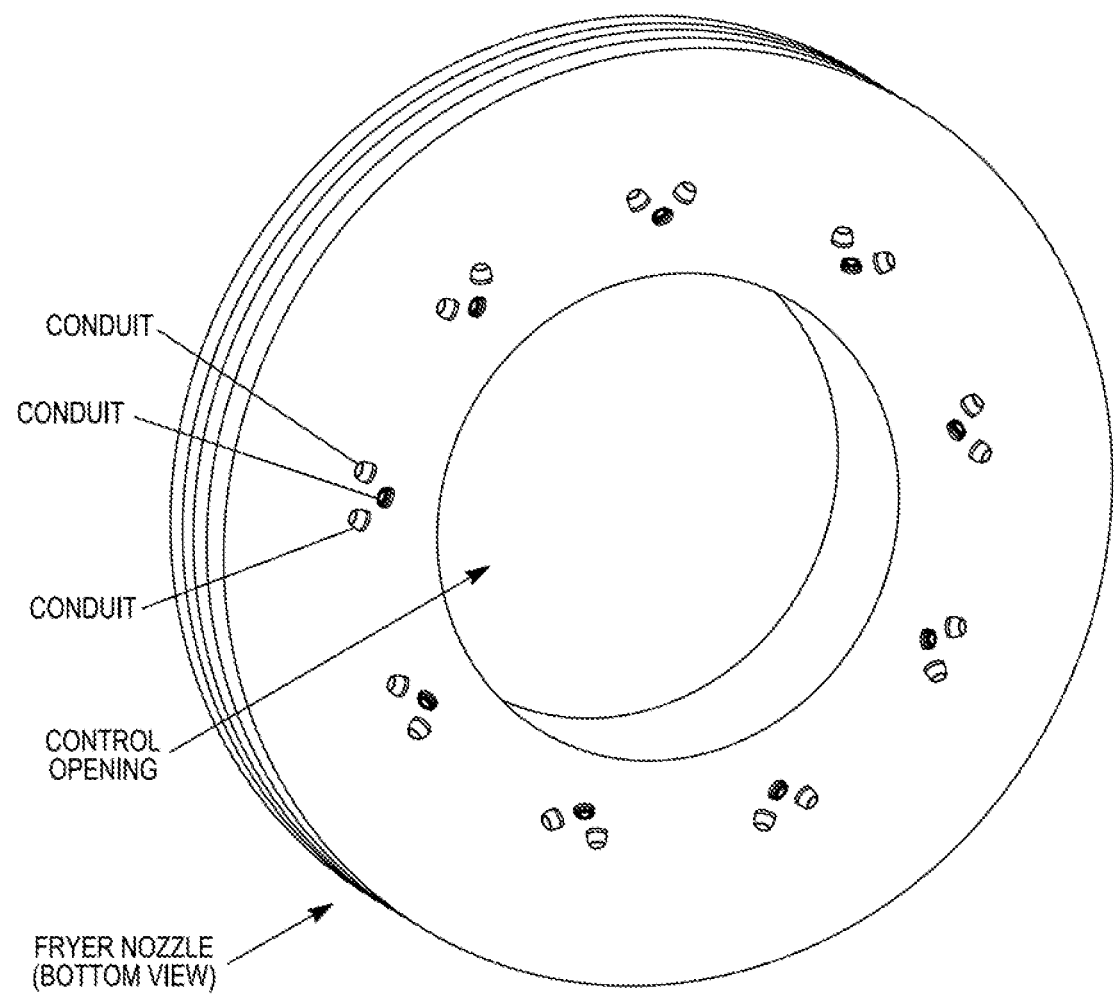
FIG. 4 shows the bottom side of the fryer nozzle employed in the nozzle assembly of FIG. 3.

FIG. 4 shows the bottom side of the fryer nozzle, illustrating an array of jet orifices through which the air and oil are emitted into the central orifice through which the premixed product flows. The nozzle jet orifices are positioned such that the jets provide a swirling air/oil mix which surrounds the product as it ejects from the extruder barrel into the nozzle body. The orifices are formed by conduits that extend through the fryer nozzle. In this embodiment the conduits are arranged in sets of three, the innermost conduit in each set conducting the oil and the outer two conduits in each set conducting the pressurized air. The air acts as both a hot-air fryer and also serves to break up the oil into a fine mist of atomized oil. The conduits extend through the fryer nozzle at angles that direct the fluids (oil and air) towards the premixed product in the central opening. While the embodiment of the fryer nozzle shown in the figures includes nine sets of fluid conduits symmetrically arranged around the central opening, more generally any number of conduit sets may be employed and arranged in any suitable manner. Moreover, in some cases each set may contain more or fewer orifices than the three depicted in the figures. For example, in some embodiments each set of orifices may include only two fluid conduits, one for air and one for oil.

Figure 5:
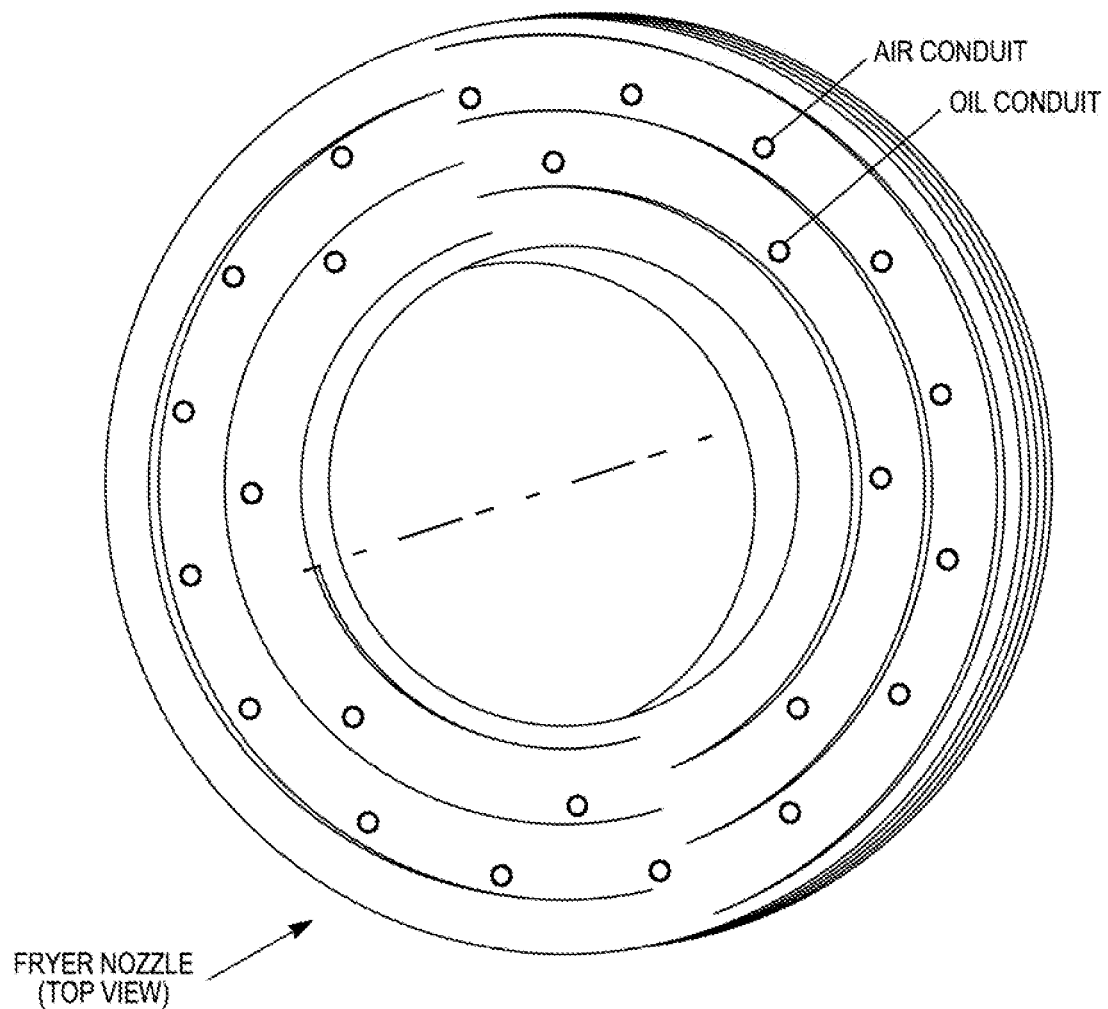
FIG. 5 shows a view of the top side of the fryer nozzle shown in FIG. 4
Figure 6:
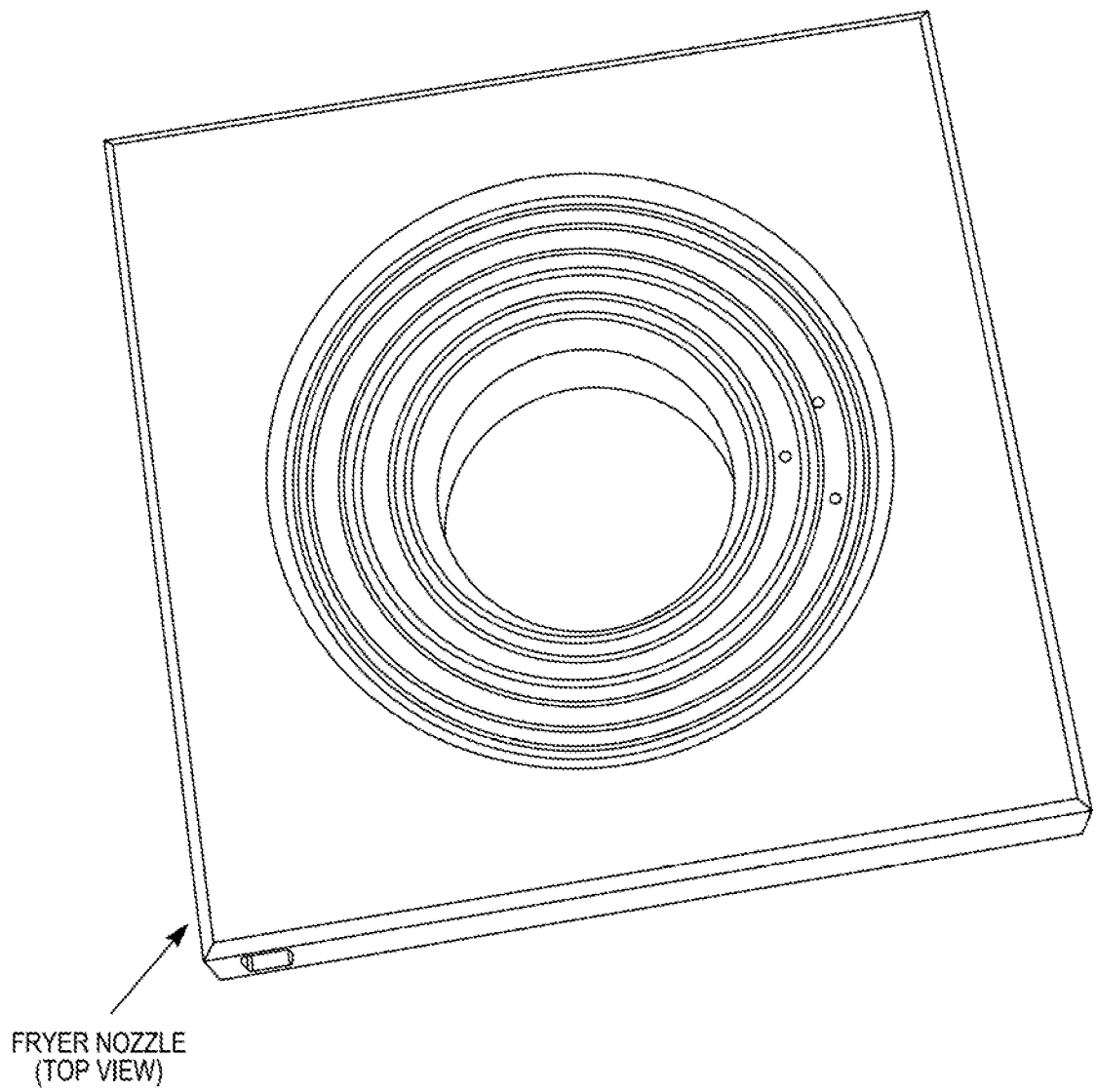
FIG. 6 shows another view of the top side of the fryer nozzle illustrating the structure of the annular chambers, separated by O-rings.

FIG. 5 shows a view of the top side of the fryer nozzle. As shown, the outer ring of fluid orifices forms an input of an air conduit. Likewise, the inner ring of fluid orifices forms an input of the oil conduits. FIG. 6 shows another view of the top side of the fryer nozzle illustrating the structure of the annular chambers, separated by O-rings. Air and oil are separated and directed to either the inner chamber or the outer chamber. The inner chamber carries oil. The center orifice carries the oil from the inner chamber to the oil atomizer orifice on the upper surface of the fryer nozzle. In FIG. 6 only a single set of fluid conduits is shown.

Figure 7:
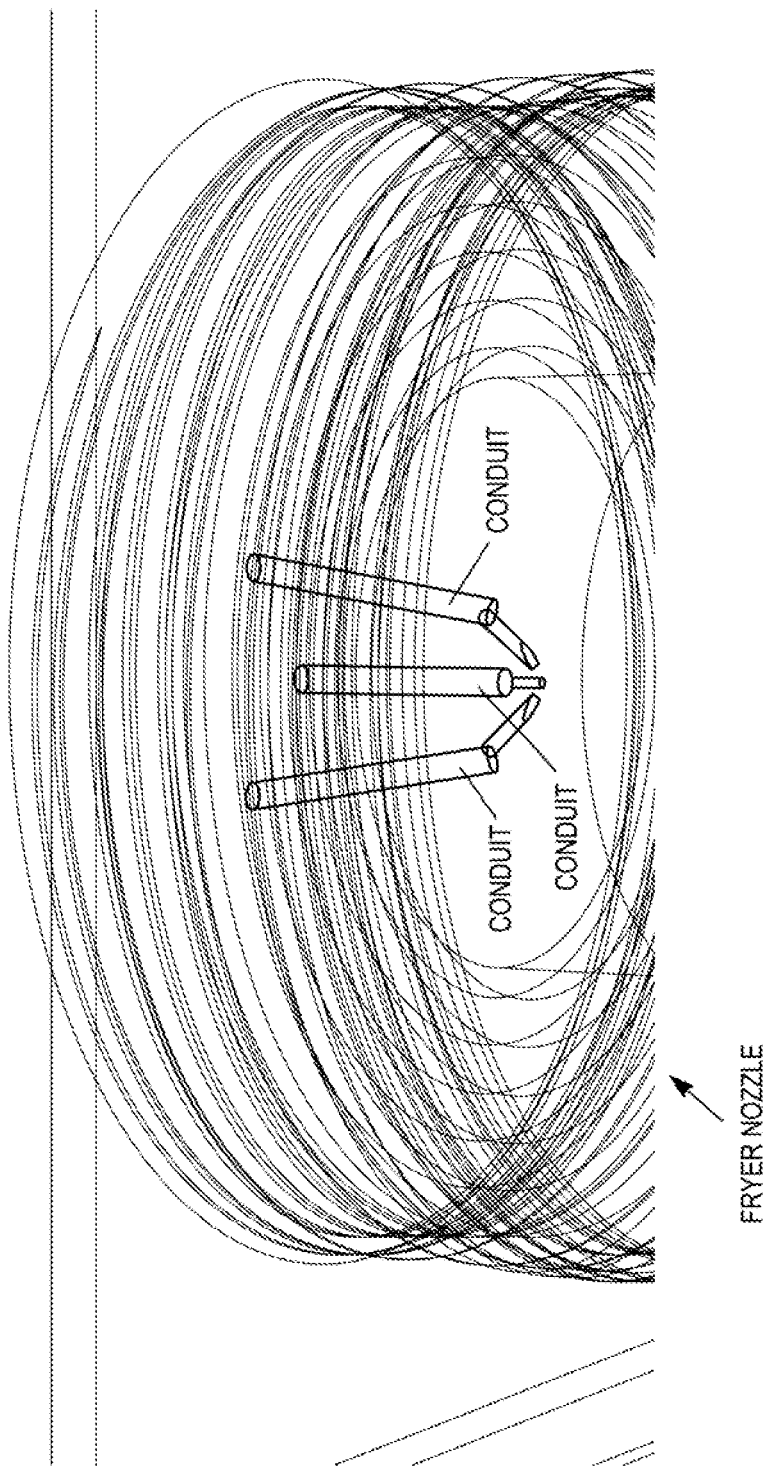
FIGS. 7 and 8 are schematic diagrams of the fryer nozzle in a transparent view illustrating the conduits that extend therethrough.
Figure 8:
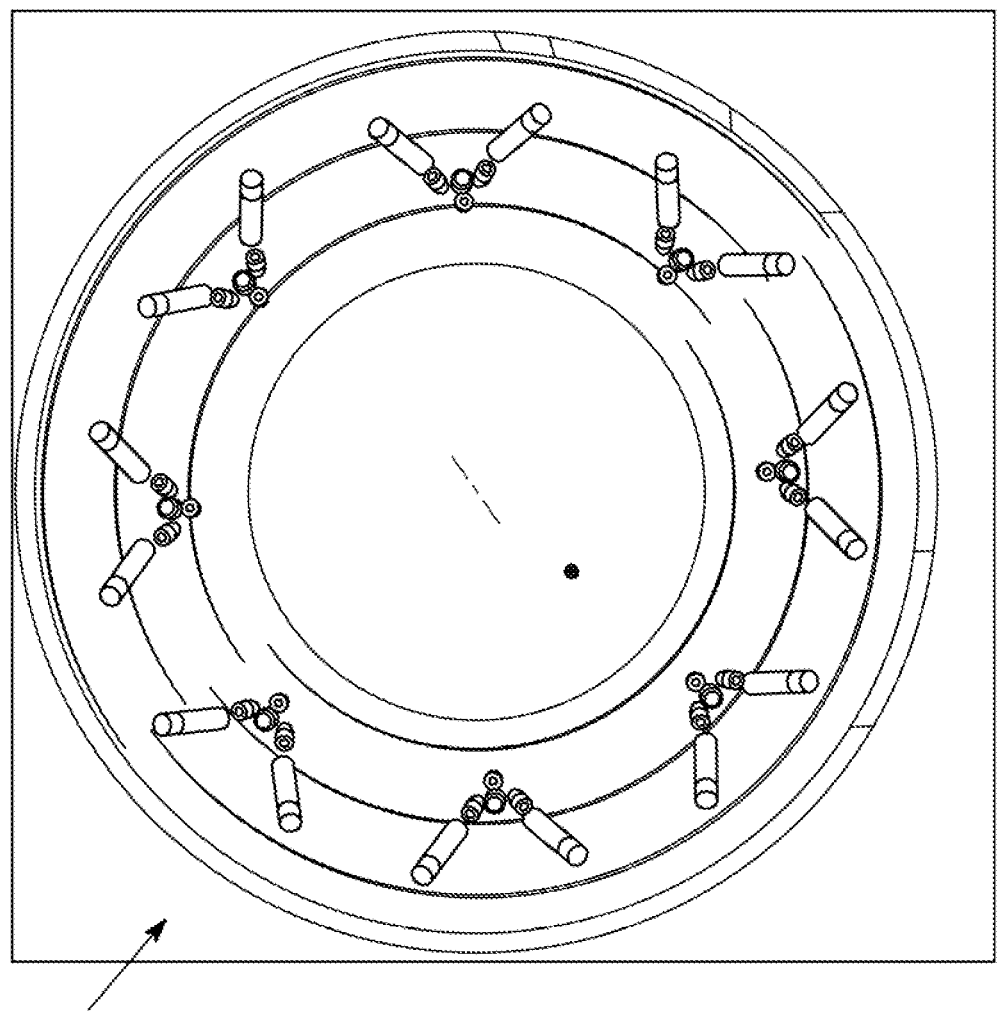

FIGS. 7 and 8 are schematic diagrams of the fryer nozzle in a transparent view illustrating the conduits that extend therethrough and which direct the air and oil toward the center of the central opening. The conduits are similar in concept to galleries that define an oil path inside an engine or other mechanical device which uses pressurized oil. An input path is provided by machining an input orifice in the fryer nozzle. An output path is provided by machining an output orifice. This configuration, commonly known as a 'gallery,' allows optimization of the cross section of input/output orifices and also provides a 3D path from one face of the fryer nozzle with one diameter to the opposite face of the fryer nozzle with a different diameter. As seen in FIGS. 7 and 8, the conduits are formed at angles. The three orifices on the bottom surface of the fryer nozzle which form the atomizer meet the three orifices coming from the top annular chambers of the fryer nozzle.

In some embodiments a multiproduct nozzle array may be employed to allow multiple products to be cooked in a single machine, where one nozzle assembly is provided for each different product, where the different nozzle assemblies collectively form a nozzle array that may be moved into position when in use, or which may be fed by a short length of tubing. Nozzle positioning may be configured in several ways. For straight product output by gravity, the nozzle can be fixed. In multi-product or shape-controlled application, the nozzle position may be controlled in x, y, z axes by a robot or gantry, and positioned to allow the thickness of the product to be controlled by its motion as the product is deposited. Various shapes or plan views, including spirals, crosses, criss-crosses, etc., can thereby be created. The product may exit the machine, e.g., may be deposited directly into an output bag, to an output tray, a moving wire-mesh conveyor, or flip-plate. With a triple-concentric nozzle an outer crust may be applied at the nozzle, allowing further preparation possibilities.

Regarding the heated nozzle assembly as described, the heating of the oil is intended to be at the point of use, i.e., at the nozzle orifice. For heating the nozzle, a flat ceramic heater or small tubular (e.g., ⅛ inch or ¼ inch) cartridge heaters with integral thermocouples may be employed. The energy capability of the nozzle heaters is be such that they are capable of providing heated oil output with room temperature oil input. In some implementations, the nozzle outlet temperature may be controlled to within 1° C. The oil pump output temperature may be monitored as a control input to the servo system. For small portions of cooked food, the amount of oil consumed per food article may be on the order of 1 teaspoon or less.

In one implementation, exemplary steps of operation area as follows:
1. Idle state has the mixing roller in the raised position, allowing the cassette to be inserted.
2. Cassette is inserted into the fryer by the user and the user initiates that automatic frying process.
3. Syringe is lowered to pierce the pouch.
4. Water valve opens.
5. Water flow monitored based on recipe or other source of process parameter values.
6. Water flow stops.
7. Syringe is withdrawn.
8. Mix roller is located at the top of the pouch, and moves into the pressure position, applying pressure to the pouch,
9. Mix roller oscillates up and down according to recipe.
10. When complete, mix roller moves to the initial no-pressure position at the top of the pouch.
11. Extrusion tube is pushed up to cut seal into the bottom of the Pouch.
12. Nozzle heater energized.
13. Wait until nozzle pre-heated to appropriate temperature.
14. Oil/air turned on in accordance with the recipe.
15. Roller moves downward, extruding the product out the extrusion tube.
16. Guillotine operates to cut product to length if required.
17. Turn off oil feed.
18. Continue air feed for purging.
19. Turn off air.
20. Return to idle state.

All the steps presented above after the user initiates the automatic frying process are performed automatically under the control of the processor.

In some embodiments, after the fryer has sequenced through some number of cycles to produce fried products, nozzle cleaning may be performed in an automatic fashion to provide reliable nozzle operation, i.e., a self-cleaning operation. This is achieved through a water purge cycle, which also flushes the mixer pouch. Waste water is ejected into a bin.

In one particular embodiment, an automated aseptic fryer is presented. The fryer includes a processor configured to control a process of preparing an edible fried food product and a housing having an opening for receiving a disposable cassette at a predetermined location and in a predetermined orientation. The disposable cassette contains a sealed flexible pouch containing a dry friable mixture therein that forms the fried edible food product when fried. An actuatable piercing element is configured to pierce a top portion of the sealed flexible pouch when in the predetermined location and orientation. The actuatable piercing element is actuatable under control of the processor. A tubular member having an orifice is provided for introducing water through an opening formed by the piercing element in the top portion of the sealed flexible pouch. A control valve controls a flow of water through the orifice under control of the processor. A roller arrangement is provided having rollers which, under control of the processor, contacts the sealed flexible pouch and causes mixing of the dry friable mixture and the water to thereby form a premixed product. An actuatable extrusion tube is configured to move between a retracted state and an extended state in which an opening is cut in a bottom of the sealed flexible pouch. The actuatable extrusion tube is actuatable under the control of the processor. A nozzle assembly is arranged to receive the premixed product from the sealed flexible pouch through the extrusion tube. The nozzle arrangement includes a fryer nozzle having a central opening through which the premixed product passes and a series of fluid conduits that extend through the fryer nozzle and conduct fluid to the premixed product as the premixed product passes through the central opening. The series of fluid conduits include a plurality of two or more fluid conduits. One of the two or more fluid conduits conduct pressurized air heated to a predetermined temperature under the control of the processor and the other of the two or more fluid conduits conducting pressurized cooking oil heated to a predetermined temperature under control of the processor. The pressurized cooking oil is atomized by the pressurized air.

In accordance with one aspect of the invention, the plurality of two or more fluid conduits that extend through the fryer nozzle may be arranged annularly around the central opening.

In accordance with another aspect of the invention, at least one of the plurality of two or more fluid conduits may include three fluid conduits, wherein a third of the fluid conduits conducts air heated to the first predetermined temperature under the control of the processor.

In accordance with another aspect of the invention, each of the plurality of two or more fluid conduits may include three fluid conduits, wherein a third of the fluid conduits conducts air heated to the first predetermined temperature under the control of the processor.

In accordance with another aspect of the invention, the plurality of two or more fluid conduits may include at least three sets of fluid conduits distributed in an annular arrangement surrounding the central opening.

In accordance with another aspect of the invention, the plurality of two or more fluid conduits may include multiple sets of fluid conduits distributed in an annular arrangement surrounding the central opening.

In accordance with another aspect of the invention, the premixed product may be a dough.

In accordance with another aspect of the invention, the premixed product may include dried, powdered or reconstituted fruits or vegetables.

In accordance with another aspect of the invention, the roller arrangement may be further configured to contact the sealed flexible packet to facilitate transfer of the premixed product through the actuatable extrusion tube.

In accordance with another aspect of the invention, the automated aseptic fryer may include a guillotine for slicing a fried product as it exits the nozzle arrangement.

In accordance with another aspect of the invention, the actuatable piercing element and the tubular member may be collectively formed by a syringe.

In accordance with another aspect of the invention, the cassette may include a machine-readable identifier that allows process parameter values to be obtained, the process parameter values to be used by the processor in the process of preparing the edible fried food product.

In accordance with another aspect of the invention, the machine-reader identifier may specify the process parameter values.

In accordance with another aspect of the invention, the machine-reader identifier may provide a network address from which the process parameter values are obtained.

Variations will be understood by one of ordinary skill in the art given the teachings in this specification. For example, the use of food in powder form may be employed to ensure a long shelf life. Systems and methods according to present principles may employ software to control the process. Toppings may be employed, using a depositor, such as the type used in an inkjet printer. Waste oil may be recovered, and the oil used in cooking/frying may be kept fresh as it is at room temperature. In some embodiments, the automatic fryer may be provided in a vending machine format in which the customer first chooses from among a selection of cartidges, after which the selected cartridge is automatically inserted into the fryer by the vending machine itself or is manually inserted into the fryer by the customer. In other embodiments the automatic fryer may be incorporated as a part of a mobile production system that may be installed in a truck or the like.

Aspects of the subject matter described herein may be described in the general context of computer-executable instructions, such as computer programs, being executed by a processor, for control of the fryer. Generally, computer programs include routines, programs, objects, components, data structures, and so forth, which perform particular tasks or implement particular abstract data types. The computer-executable instructions may be implemented using standard programming and/or engineering techniques to produce software, firmware, hardware, or any combination thereof to control a processor to implement the disclosed subject matter. For instance, the computer-readable storage medium embedded with a computer executable program, which encompasses a computer program accessible from any computer-readable storage device or storage media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). However, computer readable storage media do not include transitory forms of storage such as propagating signals, for example.

While the invention herein disclosed is capable of obtaining the objects hereinbefore stated, it is to be understood that this disclosure is merely illustrative of some embodiments of the invention and that no limitations are intended other than as described in the appended claims.

The invention claimed is:

1. An automated aseptic fryer, comprising:
a processor configured to control a process of preparing an edible fried food product;
a housing having an opening that is containing a disposable cassette at a predetermined location and in a predetermined orientation, the disposable cassette containing a sealed flexible pouch containing a dry friable mixture therein that forms the fried edible food product when fried;
an actuatable piercing element configured to pierce a top portion of the sealed flexible pouch when in the predetermined location and orientation, the actuatable piercing element being actuatable under control of the processor;
a tubular member having an orifice for introducing water through an opening formed by the piercing element in the top portion of the sealed flexible pouch, a control valve controlling a flow of water through the orifice under control of the processor, wherein the actuatable piercing element and the tubular member are collectively formed by a syringe;
a roller arrangement having a roller which, under control of the processor, contacts the sealed flexible pouch and causes mixing of the dry friable mixture and the water to thereby form a premixed product;
an actuatable extrusion tube configured to move between a retracted state and an extended state in which an opening is cut in a bottom of the sealed flexible pouch, the actuatable extrusion tube being actuatable under the control of the processor; and
a nozzle assembly arranged to receive the premixed product from the sealed flexible pouch through the actuatable extrusion tube, the nozzle assembly including a fryer nozzle having a central opening through which the premixed product passes and a series of fluid conduits that extend through the fryer nozzle and conduct fluid to the premixed product as the premixed product passes through the central opening, the series of fluid conduits including a plurality of two or more fluid conduits, one of the two or more fluid conduits conducting pressurized air heated to a predetermined temperature under the control of the processor and the other of the two or more fluid conduits conducting pressurized cooking oil heated to a predetermined temperature under control of the processor, the pressurized cooking oil being atomized by the pressurized air.

2. The automated aseptic fryer of claim 1 wherein the plurality of two or more fluid conduits that extend through the fryer nozzle are arranged annularly around the central opening.

3. The automated aseptic fryer of claim 1 wherein at least one of the plurality of two or more fluid conduits includes three fluid conduits, wherein a third of the fluid conduits conducts air heated to the first predetermined temperature under the control of the processor.

4. The automated aseptic fryer of claim 3 wherein each of the plurality of two or more fluid conduits includes three fluid conduits, wherein a third of the fluid conduits conducts air heated to the first predetermined temperature under the control of the processor.

5. The automated aseptic fryer of claim 4 wherein the plurality of two or more fluid conduits includes at least three sets of fluid conduits distributed in an annular arrangement surrounding the central opening.

6. The automated aseptic fryer of claim 5 wherein the plurality of two or more fluid conduits includes multiple sets of fluid conduits distributed in an annular arrangement surrounding the central opening.

7. The automated aseptic fryer of claim 1 wherein the premixed product is a dough.

8. The automated aseptic fryer of claim 1 wherein the premixed product includes dried, powdered or reconstituted fruits or vegetables.

9. The automated aseptic fryer of claim 1 wherein the roller arrangement is further configured to contact the sealed flexible pouch to facilitate transfer of the premixed product through the actuatable extrusion tube.

10. The automated aseptic fryer of claim 1 further comprising a guillotine for slicing a fried product as it exits the nozzle assembly.

11. The automated aseptic fryer of claim 1 wherein the disposable cassette includes a machine-readable identifier that allows process parameter values to be obtained, the process parameter values to be used by the processor in the process of preparing the edible fried food product.

12. The automated aseptic fryer of claim 11 wherein the machine-reader identifier specifies the process parameter values.

13. The automated aseptic fryer of claim 11 wherein the machine-reader identifier provides a network address from which the process parameter values are obtained.

* * * * *